United States Patent
Buchmann et al.

(10) Patent No.: US 10,855,199 B2
(45) Date of Patent: Dec. 1, 2020

(54) VOLTAGE BALANCING IN A MODULAR MULTILEVEL CONVERTER HAVING DELTA CONFIGURATION

(71) Applicant: ABB Power Grids Switzerland AG, Baden (CH)

(72) Inventors: Beat Buchmann, Nussbaumen (CH); Jerome Fischer, Egerkingen (CH)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 15/781,006

(22) PCT Filed: Dec. 18, 2015

(86) PCT No.: PCT/EP2015/080633
§ 371 (c)(1),
(2) Date: Jun. 1, 2018

(87) PCT Pub. No.: WO2017/102033
PCT Pub. Date: Jun. 22, 2017

(65) Prior Publication Data
US 2019/0288509 A1    Sep. 19, 2019

(51) Int. Cl.
*H02M 7/483* (2007.01)
*H02J 3/18* (2006.01)
*H02M 1/32* (2007.01)

(52) U.S. Cl.
CPC .......... *H02M 7/483* (2013.01); *H02J 3/1857* (2013.01); *H02M 1/32* (2013.01); *H02M 2001/322* (2013.01); *H02M 2007/4835* (2013.01)

(58) Field of Classification Search
CPC ......... H02M 7/483; H02M 2007/4835; H02M 1/32; H02J 3/1857; H02J 7/0016
See application file for complete search history.

(56) References Cited

U.S. PATENT DOCUMENTS

| 5,532,575 A | 7/1996 | Ainsworth et al. |
| 5,761,058 A * | 6/1998 | Kanda ............ H02M 7/49 307/110 |

(Continued)

FOREIGN PATENT DOCUMENTS

| CN | 102231526 A | 11/2011 |
| CN | 102739071 A | 10/2012 |

(Continued)

OTHER PUBLICATIONS

English translation of the Korean Office Action, dated Jul. 10, 2018, for Korean Application No. 10-2018-7017280.

(Continued)

*Primary Examiner* — Alex Torres-Rivera
(74) *Attorney, Agent, or Firm* — Slater Matsil, LLP

(57) ABSTRACT

A method of discharging a Modular Multilevel Converter (MMC) includes a plurality of phase legs connected in delta configuration. Each leg includes a plurality of series connected submodules, each submodule including an energy storage. The method includes disconnecting the MMC from an electrical grid, discharging the energy storages by means of a circulating current, and reconnecting the MMC to the electrical grid. The discharging includes, for each phase leg, setting a voltage reference, and sequentially selecting submodules in zero state by means of a sorting algorithm for switching each of the selected submodules to plus or minus state until the voltage deviation from the set voltage reference of the energy storage of each submodule in the phase leg is within a predefined range.

17 Claims, 2 Drawing Sheets

(56) References Cited

U.S. PATENT DOCUMENTS

| | | | |
|---|---|---|---|
| 7,230,837 B1* | 6/2007 | Huang | H02J 3/1857 327/175 |
| 2012/0063181 A1* | 3/2012 | Chimento | H02J 3/1857 363/56.03 |
| 2014/0218986 A1 | 8/2014 | Hasler et al. | |
| 2015/0162848 A1* | 6/2015 | Harnefors | H02J 3/1814 363/78 |
| 2016/0105020 A1* | 4/2016 | Guo | H02J 3/32 307/31 |
| 2016/0164399 A1* | 6/2016 | Mueller | H02M 1/36 323/207 |
| 2017/0085193 A1* | 3/2017 | Akagi | H02M 1/42 |

FOREIGN PATENT DOCUMENTS

| | | |
|---|---|---|
| CN | 103545878 A | 1/2014 |
| CN | 103795080 A | 5/2014 |
| CN | 104201910 A | 12/2014 |
| CN | 104659807 A | 5/2015 |
| EP | 3 007 297 A1 | 4/2016 |
| JP | 2014-230438 A | 12/2014 |
| WO | WO 2010/051854 A1 | 5/2010 |
| WO | WO 2010/145706 A1 | 12/2010 |
| WO | WO 2012/167833 A1 | 12/2012 |
| WO | WO 2014/189097 A1 | 11/2014 |

OTHER PUBLICATIONS

Vasiladiotis, "Modular Multilevel Converters with Integrated Split Battery Energy Storage," Nov. 2014, pp. 1-208 (228 pages total).
Geyer et al., "Model Predictive Control of a STATCOM based on a Modular Multilevel Converter in Delta Configuration", 2015 17th European Conference on Power Electronics and Applications, Jointly Owned by EPE Association and IEEE PELS, Sep. 8, 2015, pp. 1-10, XP082500104.
International Search Report, issued in PCT/EP2015/080633, dated Aug. 29, 2016.
Written Opinion of the International Searching Authority, issued in PCT/EP2015/080633, dated Aug. 29, 2016.
English translation of the Chinese Office Action and Search Report for Chinese Application No. 201580085426.4, dated Aug. 29, 2019.
Vasiladiotis et al., "Balancing control actions for cascaded H-bridge converters with integrated battery energy storage," 15th European Conference on Power Electronics and Applications, Sep. 2-6, 2013, 11 pages.

* cited by examiner

VOLTAGE BALANCING IN A MODULAR MULTILEVEL CONVERTER HAVING DELTA CONFIGURATION

TECHNICAL FIELD

The present disclosure relates to a method of discharging a Modular Multilevel Converter (MMC) comprising a plurality of phase legs connected in delta configuration. Each phase leg comprises a plurality of series connected submodules, each submodule comprising an energy storage.

BACKGROUND

An MMC, also known as Chain-Link Converter (CLC), comprises converter branches each with a plurality of e.g. ten to forty converter cells, or converter sub-modules, connected in series, wherein the converter branches in turn may be arranged in a wye/star, delta, and/or indirect converter topology. A converter cell is either a bipolar cell with a full-bridge (H-bridge) circuit or a unipolar cell with a half-bridge circuit, and comprises a capacitor for storing energy and power semiconductor switches such as insulated gate bipolar transistor (IGBT) devices, integrated gate-commutated thyristor (IGCT) devices, gate-turn-off thyristor (GTO) devices, or MOSFETs for connecting the capacitor to the converter branch with one or two polarities. The voltage per converter cell capacitor may be between 1 kV and 6 kV, whereas the voltage of a converter branch may be in a range from 10 kV to several 100 kV. An MMC controller with a processor and corresponding software, and/or with a Field Programmable Gate Array (FPGA), is responsible for controlling the converter cells and operating the power semiconductor switches by means of a dedicated (pulse-width) modulation (PWM) scheme.

MMCs may be used in electric power transmission systems as Alternating Current (AC)-only Static VAR Compensators (Statcoms) and/or Flexible AC Transmission Systems (FACTS) devices for static power-factor correction and/or Rail Interties (frequency converters e.g. 50 Hz to 16⅔ Hz), as well as for voltage quality and stability purposes. A Statcom provides reactive power support to an electric power transmission network or grid to which the Statcom is connected, by producing or absorbing reactive power.

An operating MMC requires a certain amount of energy which must be provided to the converter before connecting the converter to an electric grid. To that purpose, charging, or pre-charging, of the converter cell capacitors is performed by way of passive charging or by reverting to external charging control.

Passive charging is executed by connecting the uncharged converter with blocked firing pulses to the main electric grid via charging resistors. The charging resistors limit the inrush current as the main breaker closes and the cell capacitors are charged to about nominal voltage by the grid voltage rectification through the freewheeling diodes of the converter. Passive charging of the capacitors is performed slowly and hence takes between ten seconds to several minutes to complete. No voltage balancing is required since the impedance of the cell Direct Current (DC) capacitors is dominant and thus the voltage drift is minor in this time range.

External charging control, on the other hand, requires additional control hardware and auxiliary power supply. The uncharged converter is connected with blocked firing pulses to the auxiliary power supply to receive a charging voltage comparable to the grid voltage of the main electric grid. External charging preferably involves a low voltage auxiliary power supply connected to a dedicated step-up charging transformer transforming the low voltage of the auxiliary power supply to the charging voltage. Charging resistors are not required in this case since the charging transformers impedance limits the inrush current.

SUMMARY

According to the present invention there is presented a method to balance the voltage in the submodules of an MMC when the grid circuit breaker is open. The converter can only be reconnected to the grid if the voltages in the submodules in each of the three phase legs in the MMC are fulfilling several criteria. There are two possible cases. Either the sum of the voltage in each submodule (also called cell) matches the grid voltage. Then the converter can be reconnected to grid immediately. Is this not completely fulfilled, then the discharging with circulating currents is initiated. The voltage in the energy storage (capacitor) in each submodule is balanced using a sorting algorithm. The sorting algorithm is switching the (typically) H-bridge submodule ('+', 'o', '−'-vector) depending on the orientation of the current and the state of the submodule (over-charged or under-charged). This will result in discharging or charging of the submodule energy storage. Thereby, the energy storages of the submodules are discharged such that the average energy over all submodules is discharged/reduced. The converter can then be recharged and afterwards reconnected to grid again, if the measured voltages are in a specific range (small voltage deviation of the submodules from the voltage reference) and no submodule lost its power supply (If the energy storage in a submodule is discharged under a minimum required voltage level, the power supply of that specific submodule is switched off). An advantage of this method is that, after a short duration for discharging and balancing, the converter can be reconnected to grid. If this method is not used, the converter is not available until the energy storages are discharged completely by the losses of the components, which takes approx. 20 min.

To reconnect the converter to the grid without completely discharging the energy storages, the method of the present invention is used to balance the submodule voltage and bring the voltage of each submodule within a predetermined range where the grid circuit breaker can be closed and the converter reconnected to the grid. There are two main criteria to fulfil so that the grid breaker can be closed again, after adequate resistive recharging as needed:

1. All submodules need to be energized. (if the voltage of a submodule's energy storage is below a certain voltage level, the power supply is switched off and not able to supply the submodule any longer). In case that some cells are not energized, they have to be charged with a charging circuit before closing the grid circuit breaker.

2. If the submodules voltages in a phase leg are deviating above a predefined range, it is not possible to close the grid circuit breaker again without leaving the safe operation area of the semiconductors (e.g. IGCTs). The submodule will be bypassed because of over voltage during the charging process. Bypassing will end in a disconnecting of the converter from grid.

According to an aspect of the present invention, there is provided a method of discharging an MMC comprising a plurality of phase legs connected in delta configuration. Each leg comprises a plurality of series connected submodules, each submodule comprising an energy storage. The method comprises disconnecting the MMC from an electrical grid, discharging the energy storages by means of a circulating current, and re-connecting the MMC to the electrical grid. The discharging comprises, for each phase leg, setting a voltage reference, and sequentially selecting submodules in zero state by means of a sorting algorithm for switching each of the selected submodules to plus or minus state until the voltage deviation from the set voltage reference of the energy storage of each submodule in the phase leg is within a predefined range.

According to another aspect of the present invention, there is provided an MMC comprising a plurality of phase legs connected in delta configuration. Each leg comprises a plurality of series connected submodules, each submodule comprising an energy storage. The MMC also comprises a circuit breaker for, in a closed position, connecting the MMC to an electrical grid, and for, in an open position, disconnecting the MMC from the electrical grid. The MMC also comprises a control arrangement configured for, when the circuit breaker is in the open position, for each phase leg, setting a voltage reference, and sequentially selecting submodules in zero state by means of a sorting algorithm for switching each of the selected submodules to plus or minus state until the voltage deviation from the set voltage reference of the energy storage of each submodule in the phase leg is within a predefined range.

If the converter is not discharged actively, i.e. is only discharged by its losses, the discharging process might take long, e.g. up to 20 minutes. In this time the converter may not reconnect to grid and has to wait until completely discharged. In normal operation in can happen that for some reasons the circuit breaker opens because of any failure in any system connected on the same bus. A common scenario is that the breaker only opens for a few seconds up to a minute and then closes again. During this time the converter has to be ready to reconnect. If the method of the present invention is used, the energy storages voltages are balanced actively by starting a discharging sequence. If the voltages are deviating only within a small range, and no submodule power supply has switched off because of too low voltage, the converter can be connected by recharging over the auxiliary charging unit or directly by closing the circuit breaker. If successfully charged, the converter can be re-connected to the grid. This process may take only some seconds.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
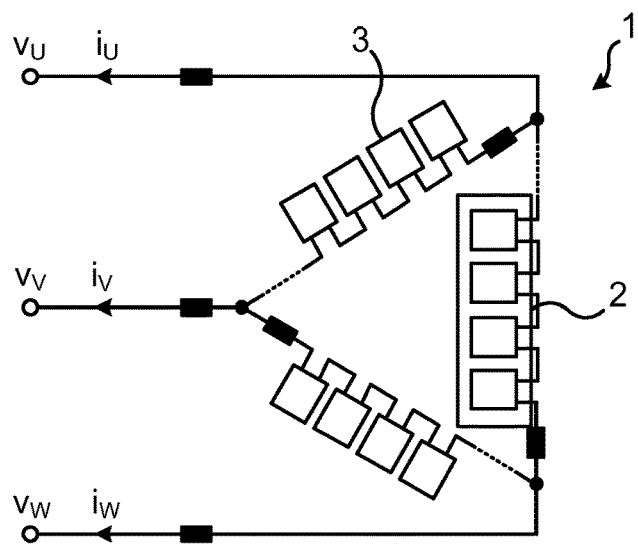
FIG. 1 is a schematic diagram of an embodiment of a delta connected MMC in accordance with the present invention.

FIG. 1 schematically illustrates an embodiment of a three-phase MMC 1. The MMC 1 comprises three phase legs 2, one per phase, connected in delta configuration. The MMC 1 is connectable to an electrical power grid (not shown) via at least one circuit breaker (not shown). The circuit breaker may comprise a sub-breaker for each phase. Each phase has a respective voltage (V) and current (i) as indicated in the figure. Each phase leg 2 comprises a plurality of series connected cells 3, herein called submodules 3.

Figure 2:
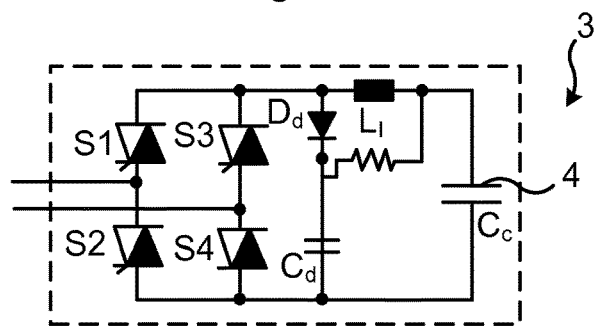
FIG. 2 is a schematic diagram of an embodiment of a submodule of an MMC in accordance with the present invention.

FIG. 2 schematically illustrates an embodiment of a bipolar submodule 3. The submodule comprises an energy storage 4, typically a capacitor, and a plurality of semiconductor switches S1-S4 (e.g. IGCTs) forming two parallel legs of a full-bridge submodule. When the submodule charge or DC voltage etc. is discussed herein, it is the state of the energy storage 4 which is intended.

Each submodule 3 can have basically four states: pulse block, plus, minus and zero state.

Pulse block state means that the current independent of sign (flowing in or out of the submodule) will charge the submodule (this state is not used with the present invention).

Zero state means that the submodule DC voltage does not change other than by slow discharging of the capacitor due to energy taken for control of the submodule. This state is used for the slow discharging according to conventional methods.

Plus state with current flowing into the submodule means that the submodule DC voltage is increasing.

Plus state with current flowing out of the submodule means that the submodule DC voltage is decreasing.

Minus state with current flowing into the submodule means that the submodule DC voltage is decreasing.

Minus state with current flowing out of the submodule means that the submodule DC voltage is increasing.

In accordance with the present invention, typically all the submodules are in plus, minus or zero state, not in pulse-Mock state. The number of cells in zero state changes according to the sinusoidal reference voltage (At zero crossing, all modules are in zero state. At peak voltage, most of the cells are in plus state for the positive half wave respectively in the minus state for the negative half wave). The sorting algorithm of the present disclosure therefore selects a submodule in zero state with the lowest DC voltage to be switched to plus or minus state in case submodule DC voltage will be increasing (plus state with current flowing into the submodule, or minus state with current flowing out of the submodule). Similarly, a submodule in zero state with the highest DC voltage is selected to be switched to plus or minus state in case submodule DC voltage will be decreasing (plus state with current flowing out of the submodule, or minus state with current flowing into the submodule).

Whether a zero state submodule is switched to plus or minus state depends on whether the voltage reference is in its positive or negative half wave.

In accordance with the present method, the MMC 1 is actively discharged in a relatively fast manner. The average DC voltage of all submodules in the phase leg decreases even if the DC voltage of individual submodules may be increased (as discussed above).

As mentioned above, if the main circuit breaker is opened, the voltage of each phase leg 2 has to be in a specific range so that the circuit breaker can be closed again and the converter is able to continue operation. If the deviation of the voltage of the energy storages 4 in at least one phase leg is too high, a balancing of the voltage of each submodule 3 in each phase leg is performed individually. This is done with a voltage reference for each phase leg 2. The series connected submodules 3 see the same charging current if the circuit breaker is closed. The energy storages (capacitors) 4 which are already charged close to the upper limit of their safe operation range may then be charged to a level above the safe operation range. If there are no actions taken, an overvoltage in a capacitor 4 may lead to a firing of a bypass thyristor. A bypassed submodule 3 is no longer available for further operation. This overcharging of the capacitor is prevented by balancing the voltage level within a predefined range. The balancing is done until either all measured voltages of the submodules have a small deviation from the reference, or the power supply of the submodules is switched off because of the too low voltage level in its energy storage 4. This switching off behaviour of the submodule power supply can be used because of the topology in which the submodule power supplies are connected to the energy storage (capacitor) 4 and have a predefined voltage level where they switch on/off.

The here described method to balance the voltages in the submodules 3 uses a voltage reference e.g. in open loop control (no closed loop control is implemented) for each phase leg. The sorting algorithm used to balance the submodules will select submodules 3 to either set positive, zero or negative state depending on the orientation of the current. Thus, the higher charged energy storages 4 will be discharged and lower charged energy storages charged. If this is done over a few cycles, the submodules get balanced to the same voltage level (small deviation acceptable) in accordance with the voltage reference.

By means of the method to balance the voltage of each submodule disclosed herein, the circuit breaker can be closed within a short time (e.g. almost immediately) after it was opened because of e.g. a fault in the surrounding system. A criteria to reclose the breaker may be that all submodule voltages are not spread above a certain predefined deviation from the voltage reference. A second condition may be that all submodule power supplies are still powered.

If the measured voltages in the energy storages 4 are high enough, the circuit breaker can be closed immediately. Otherwise, pre-charging over resistors may be performed first, then the converter 1 may start boosting the voltage of the energy storages 4 up to nominal voltage. If nominal voltage is obtained, the circuit breaker can be closed and the converter goes back to operation in only a few seconds. If the method disclosed herein is not used, the converter would be blocked until the energy storages are discharged by the losses of the devices in each submodule.

Active discharging is performed by setting a voltage reference and frequency for each phase leg 2. Due to the delta topology, a circular current will actively discharge the energy storages 4 in each submodule 3. Additionally, power may be exchanged between the phase legs 2 for improved or faster balancing. Meanwhile, the sorting algorithm described herein may be used to balance the voltages in the submodules 3 in the each of the phase legs 2. This method may be implemented in the control software of the application in a control arrangement of the converter 1. The control arrangement may be co-located with the phase legs 2 or be external, e.g. in an external control room. The control arrangement is configured, e.g. by means of the control software, to control the converter 1 to perform the method of the present invention. Typically applications where this method might be used include static synchronous compensators (STATCOM), medium voltage converters (MVC) and, possibly in slightly adapted way, for rail grid coupling converters or converters for pump storage plants, e.g. Rail Interties (frequency converters e.g. 50 Hz to 16⅔ Hz).

Figure 3:
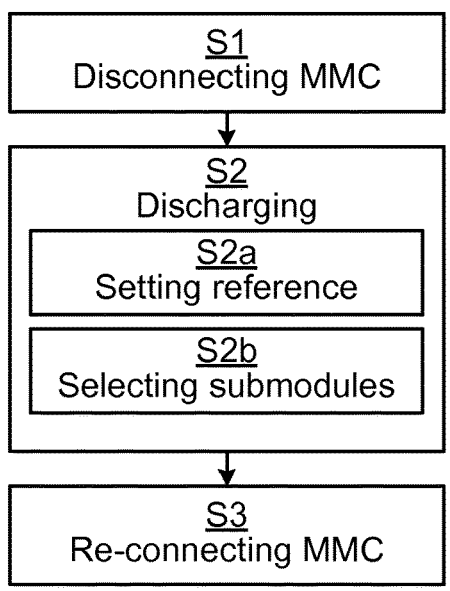
FIG. 3 is a schematic flow chart of an embodiment of a method of the present disclosure.

FIG. 3 schematically illustrates an embodiment of a method of the present disclosure. The method is for discharging an MMC 1 comprising a plurality of phase legs 2 connected in delta configuration, each leg comprising a plurality of series connected submodules 3, each submodule comprising an energy storage 4. Typically, the method is performed by a control arrangement of the MMC 1.

The method comprises disconnecting S1 the MMC 1 from an electrical grid, e.g. by opening the circuit breaker. Further, the method comprises discharging S2 the energy storages 4 by means of a circulating current, and re-connecting S3 the MMC 1 to the electrical grid, e.g. by closing the circuit breaker.

The discharging S2 comprises, for each phase leg 2, setting S2a a voltage reference, and sequentially selecting S2b submodules 3 in zero state by means of a sorting algorithm for switching each of the selected submodules to plus or minus state until the voltage deviation from the set voltage reference of the energy storage 4 of each submodule in the phase leg is within a predefined range.

Figure 4:
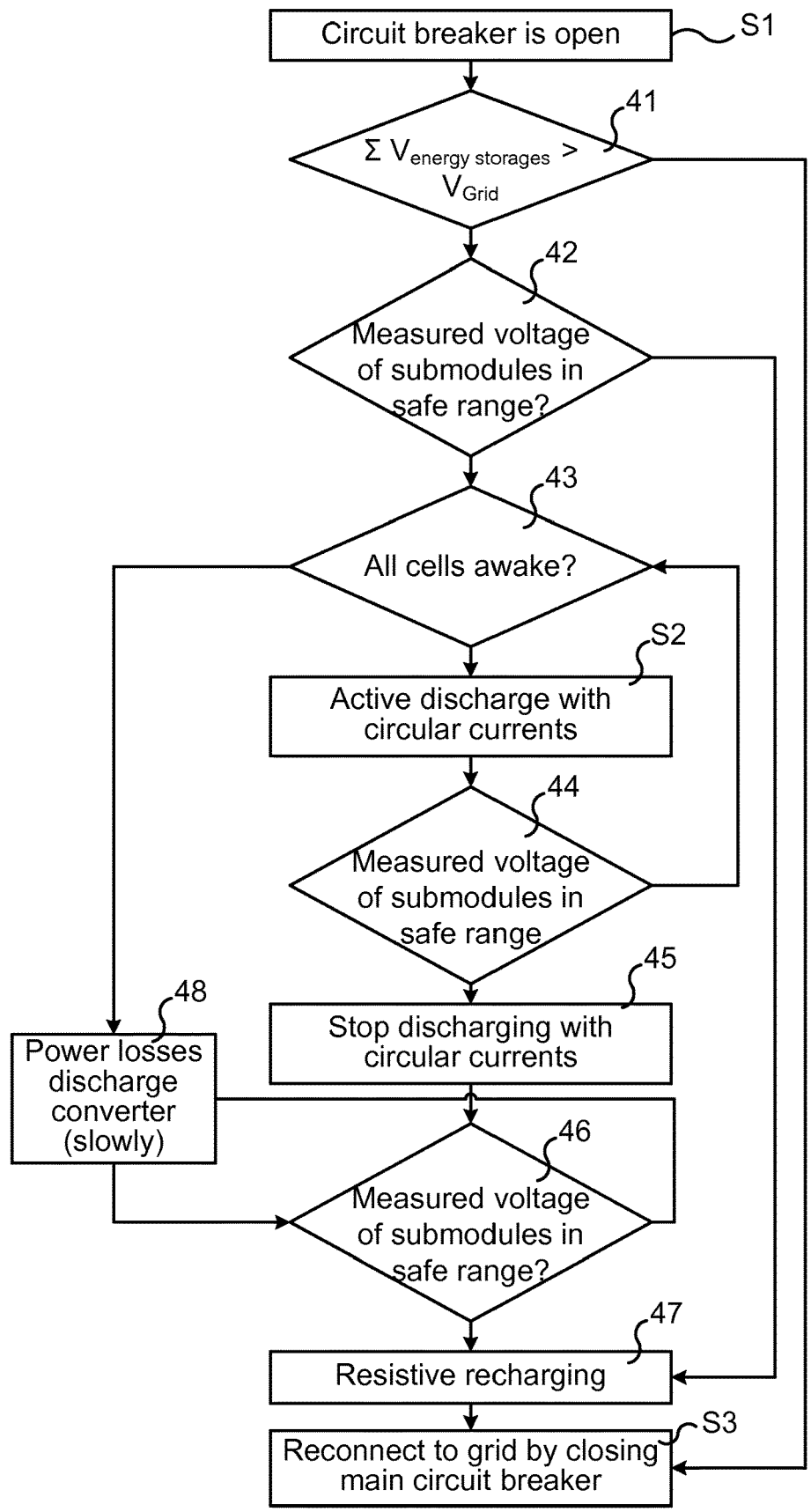
FIG. 4 is a schematic flow chart, in more detail, of an example embodiment of the method of the present invention.

FIG. 4 is a schematic flow chart, in more detail, of an example embodiment of the method of the present invention.

Step S1:
The MMC is disconnected S1 from the grid by the circuit breaker opening.

Step 41:
Yes: If the sum of measured voltages of the energy storages 4 is higher than the grid voltage, the breaker can be closed again directly, re-connecting S3 the converter.

Step 42:
Submodule voltage is measured and compared with other submodule voltages in the same phase leg 2.
No: If there is a too high deviation between submodules of one phase, the active discharging is started.
Yes: If all submodule voltages are within a safe range, active discharging is not needed and the converter is ready to be recharged 47.

Step 43:
Yes: If all submodules 3 are energized and active, the discharging with circular currents is possible.

No: If not all submodules 3 are active, the discharging is done by conventional discharging with power losses.

Step S2:

Discharging is done by running a circular current and generating higher losses in accordance with the present disclosure. This is done until a submodule 3 is no longer able to be energized due to too low voltage of the energy storage 4, or the voltage deviation of each submodule in the phase leg 2 is within the predefined range.

Step 44:

Discharging is continued until the measured voltages of the energy storages 4 are within the predetermined range.

Step 45:

Then the discharging is stopped immediately to avoid discharging a submodule too much. All submodules are now discharged to approximately the same voltage and balanced.

Steps 48 & 46:

If discharging with circular current was not possible, the energy storages 4 are discharged 48 with power losses. It is then checked whether the measured submodule voltages are within the predetermined range.

Yes: Charging 47 is allowed.

No: Conventional discharging 48 is continued.

Step 47:

Resistive re-charging.

Step S3:

Grid breaker is closed, re-connecting the converter to the electrical power grid.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of discharging a Modular Multilevel Converter (MMC) comprising a plurality of phase legs connected in delta configuration, each leg comprising a plurality of series-connected submodules, each submodule comprising an energy storage, the method comprising:
   disconnecting the MMC from an electrical grid;
   for each phase leg:
      setting a voltage reference; and
      sequentially selecting submodules in zero state with a sorting algorithm for discharging the energy storages using a circulating current flowing through the plurality of series-connected submodules in each of the phase legs connected in delta configuration, by switching each of the selected submodules to plus or minus state until a voltage deviation from the set voltage reference of the energy storage of each submodule in the each phase leg is within a predefined range;
   the sorting algorithm performing at least one of following operations in order to balance the submodules such that for the each phase leg, an average direct current (DC) voltage of all submodules in the each phase leg decreases:
      selecting a submodule in zero state with lowest energy storage voltage to be switched to plus or minus state for the energy storage voltage to increase, and
      selecting a submodule in zero state with highest energy storage voltage to be switched to plus or minus state for the energy storage voltage to decrease; and
   re-connecting the MMC to the electrical grid.

2. The method of claim 1, wherein the voltage reference has a predetermined frequency.

3. The method of claim 2, wherein the voltage reference is sinusoidal.

4. The method of claim 2, wherein the voltage reference is used in open loop control for the each phase leg.

5. The method of claim 2, wherein the discharging comprises exchanging power between the phase legs.

6. The method of claim 1, wherein the voltage reference is sinusoidal.

7. The method of claim 6, wherein the voltage reference is used in open loop control for the each phase leg.

8. The method of claim 6, wherein the discharging comprises exchanging power between the phase legs.

9. The method of claim 1, wherein the voltage reference is used in open loop control for the each phase leg.

10. The method of claim 9, wherein the discharging comprises exchanging power between the phase legs.

11. The method of claim 1, wherein the discharging comprises exchanging power between the phase legs.

12. A Modular Multilevel Converter (MMC) comprising:
   a plurality of phase legs connected in delta configuration, each leg comprising a plurality of series-connected submodules, each submodule comprising an energy storage;
   a circuit breaker for, in a closed position, connecting the MMC to an electrical grid, and for, in an open position, disconnecting the MMC from the electrical grid; and
   a control arrangement configured for, in accordance with the circuit breaker being in the open position, for each phase leg:
      setting a voltage reference; and
      sequentially selecting submodules in zero state with a sorting algorithm for discharging the energy storages using a circulating current flowing through the plurality of series-connected submodules in each of the phase legs connected in delta configuration, by switching each of the selected submodules to plus or minus state until a voltage deviation from the set voltage reference of the energy storage of each submodule in the each phase leg is within a predefined range;
   wherein the sorting algorithm is configured to perform at least one of following operations in order to balance the submodules such that for the each phase leg, an average direct current (DC) voltage of all submodules in the each phase leg decreases:
      selecting a submodule in zero state with lowest energy storage voltage to be switched to plus or minus state for the energy storage voltage to increase, and
      selecting a submodule in zero state with highest energy storage voltage to be switched to plus or minus state for the energy storage voltage to decrease.

13. The MMC of claim 12, wherein the MMC is a Static Synchronous Compensator (STATCOM) or a rail intertie.

14. The MMC of claim 12, wherein the voltage reference has a predetermined frequency.

15. The MMC of claim 12, wherein the voltage reference is sinusoidal.

16. The MMC of claim 12, wherein the voltage reference is used in open loop control for the each phase leg.

17. The MMC of claim 12, wherein the discharging comprises exchanging power between the phase legs.

* * * * *